United States Patent [19]
May, Jr.

[11] Patent Number: 5,243,760
[45] Date of Patent: Sep. 14, 1993

[54] ADJUSTABLE GEAR DRIVEN TUBE CUTTER

[76] Inventor: Myron R. May, Jr., 7837 Willowlake Ct., #7-111, Dallas, Tex. 75230

[21] Appl. No.: 793,138

[22] Filed: Nov. 18, 1991

[51] Int. Cl.$^5$ .................... B23D 21/06; B26B 27/00
[52] U.S. Cl. ............................................. 30/101; 30/97
[58] Field of Search .................. 30/92.5, 95, 96, 97, 30/100, 101; 82/60, 72

[56] References Cited

U.S. PATENT DOCUMENTS

| | | | |
|---|---|---|---|
| 3,839,791 | 10/1974 | Feamster | 30/97 |
| 3,942,248 | 3/1976 | Sherer et al. | 30/97 |
| 4,762,038 | 8/1988 | Olson | 30/97 |
| 4,769,911 | 9/1988 | Araki | 30/97 |
| 4,770,074 | 9/1988 | Kwech | 30/97 |
| 4,802,278 | 2/1989 | Vanderpol et al. | 30/97 |
| 4,939,964 | 7/1990 | Ricci | 30/97 |

Primary Examiner—Frank T. Yost
Assistant Examiner—Paul M. Heyrana, Sr.
Attorney, Agent, or Firm—John E. Vandigriff

[57] ABSTRACT

A tube cutting tool is described in which a cutting head is rotatably mounted within a tool body wherein both define "O" shaped openings to enable tubing to be inserted perpendicularly through the tool. A cutting wheel is incorporated into the cutting head such that rotation of the cutting head causes the wheel to pass around the periphery of the tube. A feed cam and lever device are incorporated which mechanically bias the cutting wheel into contact with the tube wall until the tube wall has been completely severed. A gear drive assembly transports power from a power source to the cutting head to rotate it about the tube. Stabilizing devices are utilized to help secure and align the tubing into the cutting tool during operation.

26 Claims, 7 Drawing Sheets

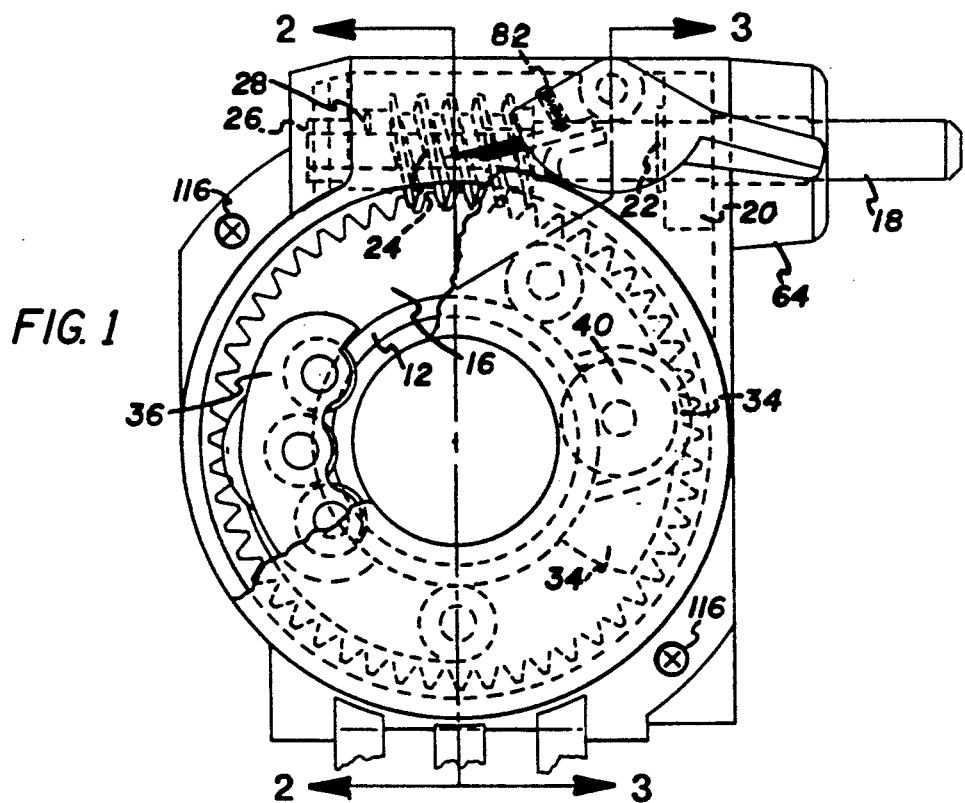
FIG. 1
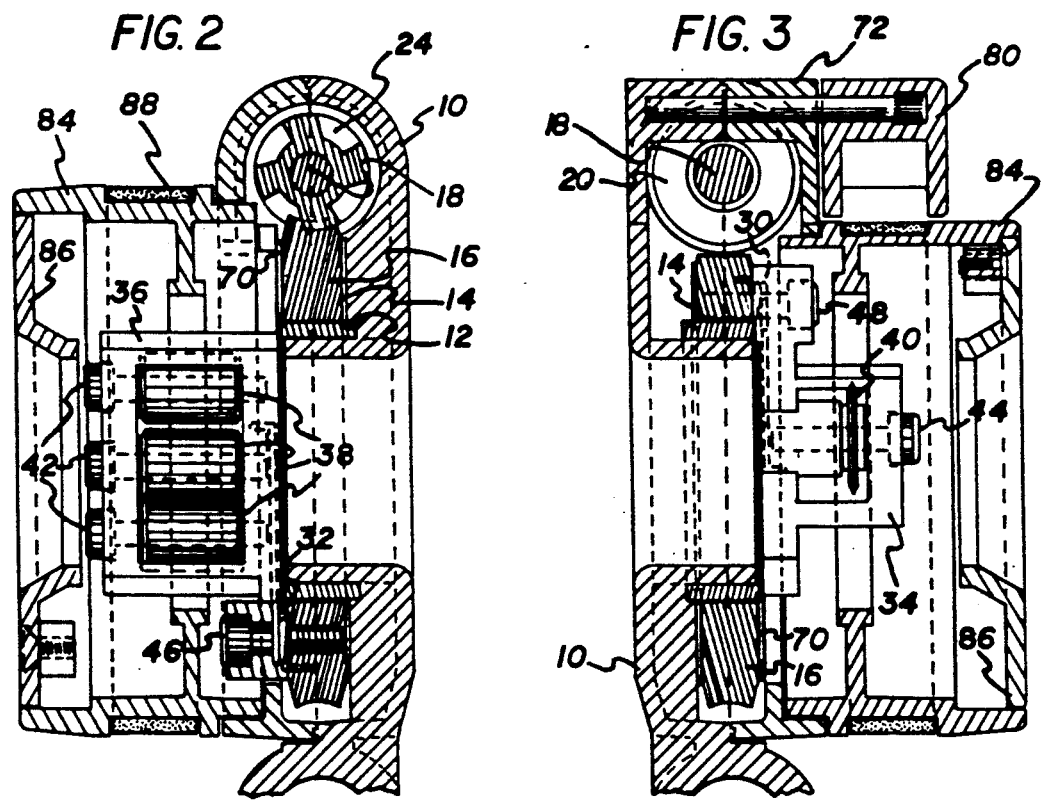
FIG. 2
FIG. 3

EXPLODED VIEW

EXPLODED VIEW

EXAMPLE
CLAMP UNIT
CONFIGURATION

ADJUSTABLE GEAR DRIVEN TUBE CUTTER

BACKGROUND—FIELD OF INVENTION

This invention relates to industrial tools, specifically to an improved tubing cutter used by by plumbers and electricians for cutting thin walled tubing such as copper and plastic water pipe and electrical conduit and is intended for assembly line style cutting of mass repetition.

BACKGROUND—DESCRIPTION OF PRIOR ART

Tube cutting tools are common and have been used in the art for decades. They typically comprise a rotatably mounted cutting wheel on a pivotable arm or a movable jaw of the tool. Through a threaded or levered compression device, the arm or jaw may be biased into contact with the outer surface of the tube. Means are provided to orbit the cutting wheel around the outer surface of the tube, resulting in the initial score of the surface. After each revolution around the tube, the cutting wheel is further biased against the surface of the tube until the tube wall is severed.

The most common form of tube cutting tool utilizes a cutting wheel mounted inside a frame work or an arm attached to a frame work. A threaded depth adjustment device which also doubles as a form of handle is used to manually rotate the entire tool about the tube. Also utilized in this most common form of tube cutting tool is any number of roller bearings which minimize orbital friction between the tool and the tube.

Several approaches have been made to elevate problems arising in unique situations such as limited access to the tube in a wall or crawl space (U.S. Pat. No. 3,795,051 Feamster 1974 and U.S. Pat. No. 4,802,278 Vanderpool 1989). These inventions are not designed for massive numbers of cuts, but for cuts made in fairly unique locations. Where the tube is readily accessible, such as construction sites and assembly sites, the problem is not unique access to the tube, but the time and effort required to cut the tubing in mass quantity.

It is this latter area in which my unique invention focuses. Speed and effort translate into time. Several tool designs exist which focus on the concept of fast repeated cuts. Unfortunately they tend to fall short with regards to one or more of the variables required to make the cuting tool fast and effective. For example, the time it takes to cut tubing tends to have two slow points: first, the setting and resetting of the cutting wheel's depth with relation to the tube being cut; second, the speed and continuity with which the tool head can be orbited around the tube being cut. The faster the cutter head can orbit the tube, the more the need for self centering cutting devices. With the exception of U.S. Pat. No. 4,416,062 to Cummings—1983, which utilizes a roller bearing and cutter wheel centering track even though it is hand driven, the majority of inventions I found completely ignored this point. It is may assumption that their lack of speed allowed for this omission.

Because time is one of the main obstacles in the tube cutting process, gear mechanisms have been introduced into inventions. Tube cutting tools (U.S. Pat. Nos. 2,281,300 to Waldo—1942, 2,447,371 to Sipsma—1948, 4,305,205 to Girala—1981, 4,416,062 to Cummings—1983 and 4,438,562 to Courty—1984) have been proposed which utilize a ratchet mechanism interposed between a cutting head and an actuating handle such that the handle itself need not be passed completely around the tube. Instead, the cutter head is rotated by oscillating the handle back and forth until the cutting head orbits around the tube a sufficient number of times to sever the tube wall. While this device has somewhat alleviated the need to reset the user's hand on the tool's handle, while manually passing the tool around the tube, it does not eliminate any time on the average cut due to the constant stopping of the handle in order to change direction to further oscillate the handle. Instead this design's advantage is more in cutting a limited access tube which can not allow for an entire tool to orbit around it.

Other tube cutters similar to ours (rotatable cutting head—gear driven) (U.S. Pat. No. 3,807,047 to Sherer—1974 and U.S. Pat. No. 4,802,278 to Vanderpool-1989) utilize a gear formed on the exterior surface of the cutting head which meshes with a set of gears and can be attached to any number of drive motors. Again one objective of these designs constantly seems to be to access tubing which is already in place or in confined locations. A 'C' shaped cutting head or split frame cutting head is necessary so that the tools can be laterally placed over tubing. By placing these demands on the prior designs, the tools are good solutions for unique or difficult to reach tubes, but have been limited in reset ability and cutting speed.

Resettability is usually affected in two ways: (U.S. Pat. No. 4,802,278 to Vanderpool—1989 and U.S. Pat. No. 4,416,062 to Cummings—1983) first, where all openings of the gear and gear housing must line up in order to place the open tool over the side of the tube; and second, where the cam or screw mechanism, which controls the cutting wheel depth to bias the wheel against the tube wall, needs to be reversed or unscrewed instead of instantly resetting for the next cut. Cutting speed is slowed for these reasons which result in the lack of rhythm allowed because of the "stop and go" of cutting alining and resetting.

Prior gear driven tube cutters also tend to contain more tooled gears and other parts than my design thus adding to cost and the chance of malfunction. The (U.S. Pat. No. 4,802,278 Vanderpool 1989) reads: "A main drive gear drives a pair of spur gears which, in turn, operatively engage a gear formed on, or attached to, the periphery of the cutting head." While cutters like this may have alleviated some of the problems associated with manually operated—slower—cutters, their need for side opened, "C" shaped' gears and housing has resulted in more tooled gears and other parts than I propose. These designs also do not utilize an automatic reset. In addition, the desire or ability to cut different diameter tubing is fully ignored in the patent descriptions.

One configuration considered in my design (FIG. 7) is a portable work station layout in which the tool mechanism is incorporated into a housing that is attached to a platform with other sub-assemblies attached to aid in guiding the tubing through the cutting head at a centered and perpendicular angle. This workstation configuration is explained in further sections.

U.S. Pat. No. 3,507,035 to Mann—1970, is described as "A portable power driven tubing cutter . . . " The patent drawings indicate that a large electric motor is attached to the frame as well as a fairly large drive roller drum. With no way to fold up or disassemble the work station it would appear difficult and unappealing to move. One of my workstation configurations (FIG. 7.) utilizes a drive shaft which can be attached to any number of power sources such as an electric drill or rotary air tool, thus it can be partially disassembled. This particular configuration can also be folded down for a low profile secure shipping and storage mode.

OBJECTS AND ADVANTAGES

Accordingly, several objects and advantages are:

(a) to provide a gear driven tube cutting tool which can be set up and broken down for easy use and storage, as well as shipping;

(b) to provide a gear driven tube cutting tool which can quickly adjust to cut several diameters of tubing concentrically;

(c) to provide a gear driven tube cutting tool which can be instantly reset to allow for rapid cutting of large amounts of tubing instead of the need by prior inventions to stop the device and manually reset both openings and feed devices;

(d) to provide a gear driven tube cutting tool which can be operated off of any number of drive motor devices;

(e) to provide a gear driven tube cutting tool which can be produced with less parts than required by earlier inventions;

(f) to provide a gear driven tube cutting tool which can be serviced by the user due to simplicity of structure, limit of parts and detail of instructions.

Further objects and advantages are to provide a gear driven tube cutting tool which can be made as both a portable work station and if desired, a base free configuration to carry during operation, which is self explanatory for the user to set up and use, which will be economical to manufacture, which in workstation form, can be configured with any length rail pipes to allow the user to customize the base around the needs of the user. Still further advantages will become apparent from a consideration of the ensuing description and drawings.

DRAWING FIGURES

FIG. 1 is a plan side view of one embodiment of the invention especially well adapted for use on smaller diameter tubes, the figure showing the cutting and roller arms in open positions as represented with breakaway and dotted lines.

FIG. 2 is a cross sectional view of the cutting tool taken along line A—A of FIG. 1.

FIG. 3 is a cross sectional view of the cutting tool taken along line B—B in FIG. 2.

Figure 4:
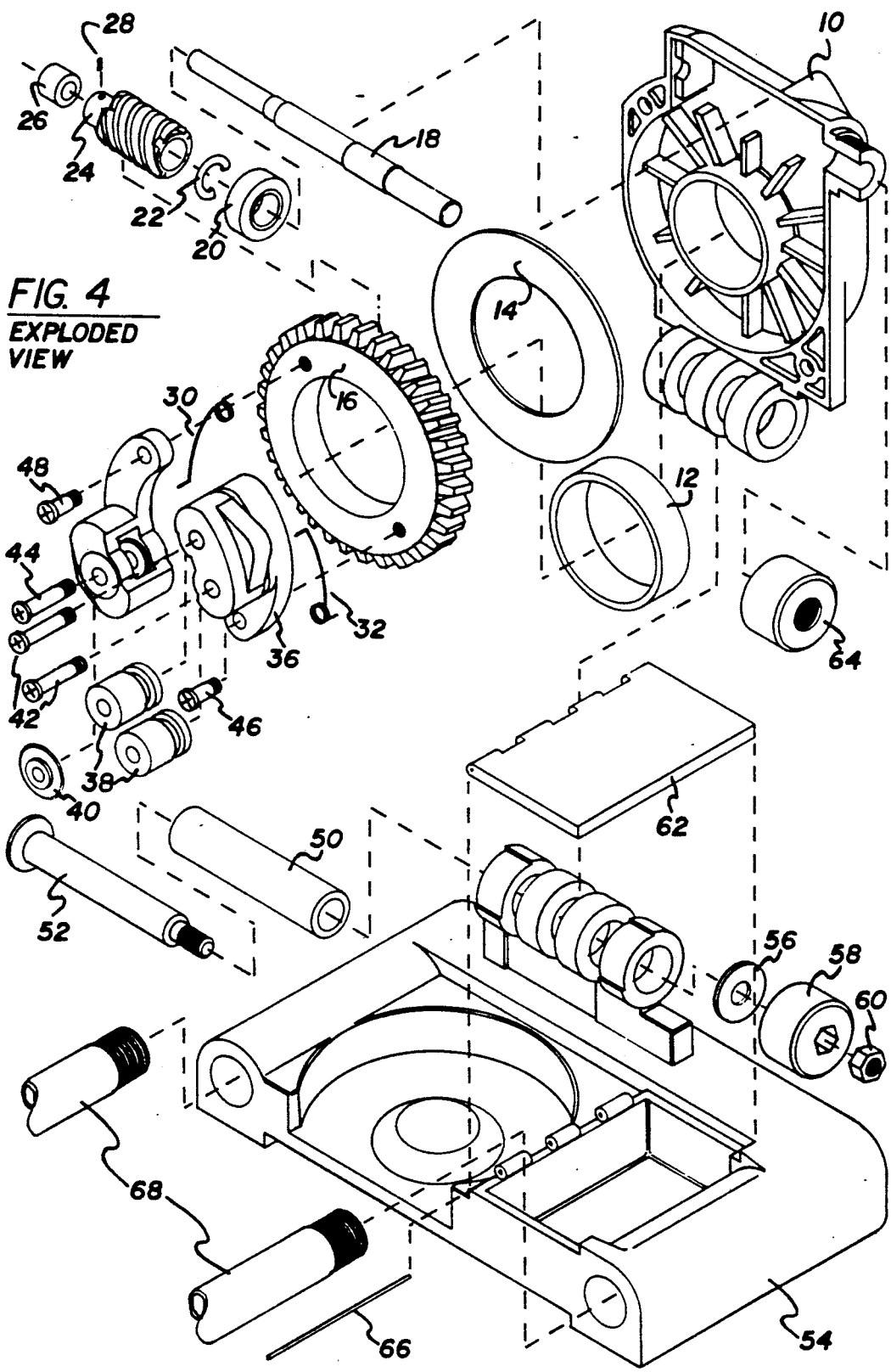
FIG. 4 is the first of three exploded views which when combined form a detailed exploded view including each part of a first embodiment of the inventive tube cutting device especially adapted for use with smaller diameter tubing.

| Reference Numerals In Drawings | |
| --- | --- |
| 10 right half - tool encasement | 12 bearing cuff |
| 14 friction washer | 16 'O' gear - worm wheel |
| 18 drive axle | 20 encased bearing |
| 22 'C' clip | 24 worm gear |
| 26 bearing cuff | 28 securing screw |
| 30 reset spring - cutter arm | 32 reset spring - roller arm |
| 34 cutter arm | 36 roller arm |
| 38 rollers | 40 cutter wheel |
| 42 screw - axis for rollers | 44 screw - axis for cutter wheel |
| 46 screw - axis for roller arm | 48 screw - axis for cutter arm |
| 50 hinge tube | 52 hinge pin |
| 54 base with half hinge | 56 compression washer |
| 58 hinge lock knob | 60 hinge nut |
| 62 storage top | 64 axle encasement cap |
| 66 storage hinge pin | 68 rail pipes |
| 70 friction washer | 72 left half - tool encasement |
| 74 'C' clip | 76 reset spring |
| 78 friction washer | 80 compression trigger |
| 82 belt securing screw | 84 compression cap - main |
| 86 compression cap - side | 88 friction belt |
| 90 compression cap side screws | 92 trough adjustment nut |
| 94 trough adjustment knob | 96 adjustable trough |
| 98 fixed trough with hinge half | 100 trough base with hinge half |
| 102 hinge nut | 104 hinge lock knob |
| 106 base lock knob | 108 rail pipe end cap |
| 110 hinge pin | 112 compression cylinder |
| 114 compression cylinder | 116 tool body screws |
| 118 drill chuck | 120 compression washer |
| 122 clamping device | 124 tubing |

DESCRIPTION OF THE PREFERRED EMBODIMENTS

FIG. 1 shows a plan (side) view of one embodiment of the invention.

The cutting tool, as seen in FIG. 2 and FIG. 3 (section views of FIG. 1), generally comprises a cutting body 10 and 72 having a worm wheel 16 rotatably mounted thereon. The worm wheel 16 rotates around a bearing cuff 12 which is securely mounted to the right half of the tool body 10 by a pressure fit. This bearing cuff 12 passes through the worm wheel's 16 central opening. Friction washers 14 and 70 are situated on either side of the worm wheel 16 to further help eliminate friction when the tool is in operation. The tool body halves are joined by two screws 116 and an axle encasement cap 64.

FIG. 2 shows a side view of a roller arm 36 with rollers 38 rotatably mounted to the arm by screw axis' 42. The arm 36 is swivel joined to the worm wheel 16 by a screw axis 46. A reset spring 32 is held in place between the roller arm 36 and the worm wheel 16 by the axis screw 46 which passes through the spring's coil. With one end of the spring inserted into a depression in the worm wheel 16 and the other end inserted into a depression in the roller arm 36, the reset spring 32 is able to counter position the arm back against a compression cap-main 84 causing a reset of the cap 84 and roller arm 36 back to their open position. This is aided by the spring load of a cutter arm discussed further.

FIG. 3 shows a side view of the cutter arm 34 with a cutter wheel 40 rotatably mounted to the arm by a screw axis 44. The arm 34 is swivel joined to the worm wheel 16 by a screw axis 48. A reset spring 30 for the cutter arm is held in place between the cutter arm 34 and the worm wheel 16 by the axis screw 48 which passes through the spring's coil. With one end of the spring inserted into a depression in the worm wheel 16 and the roller arm's inserted into a depression in the cutter arm 34, the reset spring 30 aids the other reset spring 32 in the counter positioning or reset of the roller arm 36, the cutter arm 34 and the compression cap after each cut.

(REF. FIGS. 1,2, and 3) To drive the worm wheel 16 and in turn the attached roller arm 36 and cutter arm 34, also referred to as the cutting head, a drive axle 18 is mounted to the tool body 10 and 72. By passing the drive axle through an encased bearing unit 20 and securing the bearing unit to the axle with a 'C' clip 22, the axle is able to rotate with limited friction. The encased bearing 20 is pressure fitted into depressions in the tool body halves. The axle rotates freely due to the minimal friction contacts of the attached encased bearing 20 and a bearing cuff 26 located at the inner end of the axle. This cuff is pressure fitted inside depressions in tool body 10 and 72. Mounted on to the drive axle 18 by a securing screw 28 and centered over the worm wheel 16 is a spiral worm gear 24.

Figure 5:
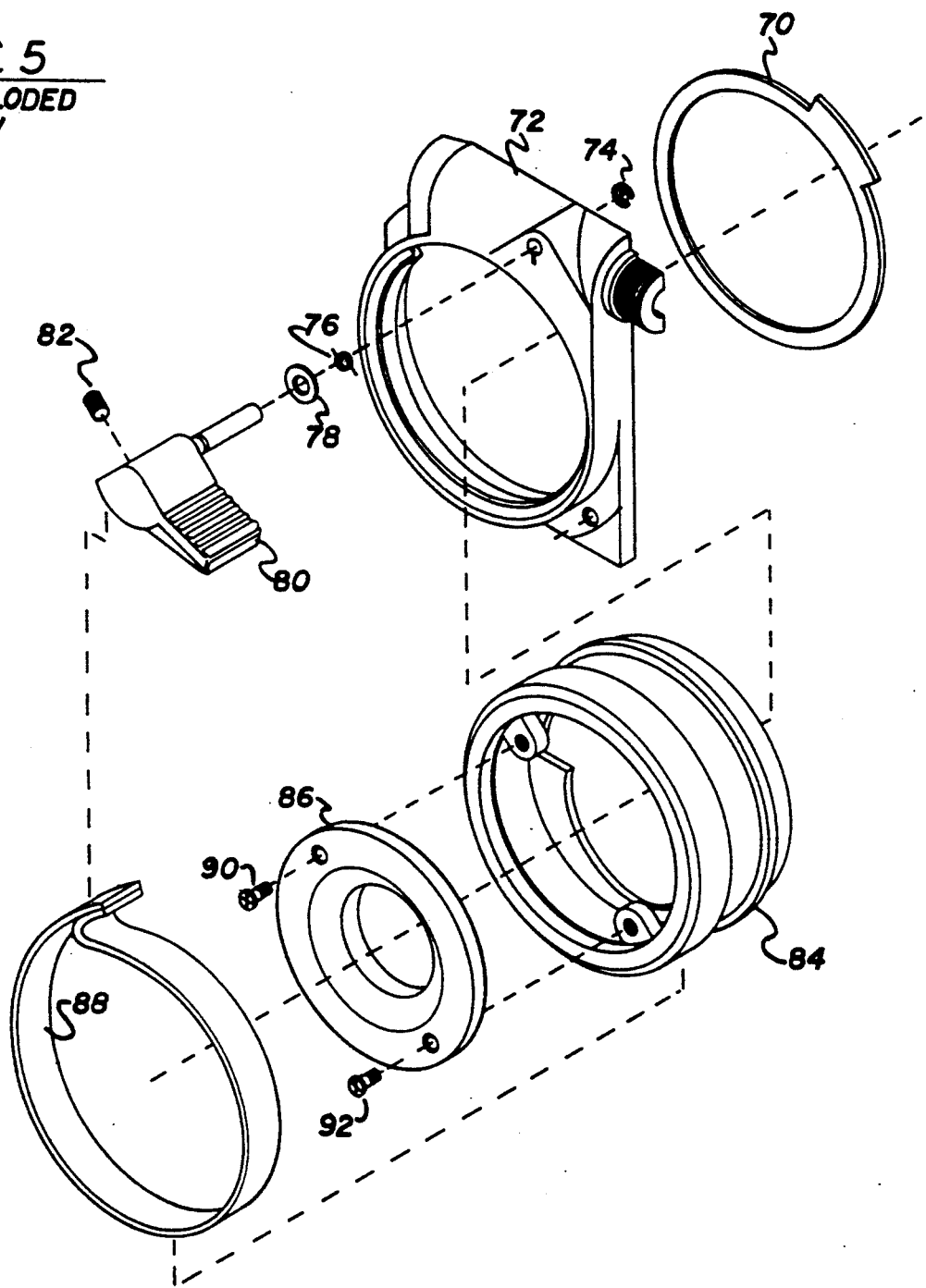
FIG. 5 is the second of three exploded views which when combined form a detailed exploded view including each part of a first embodiment of the inventive tube cutting device especially adapted for use with smaller diameter tubing.

As evidenced by FIGS. 1,2,3,9, and 10, when a drive motor or power source is interconnected with the drive axle 18, the drive axle rotates within the confines of the encased bearing 20 and the bearing cuff 26 which keep it at a constant perpendicular axis reference to the worm wheel 16 (REF. to FIGS. 4 and 5 if necessary). The worm gear 24 orbits with the drive axle 18 due to a mounting screw 28 threaded through the worm gear 24 and pinching against the drive axle 18. As the worm gear 24 rotates, the teeth of the worm gear 24 mesh with the teeth of the worm wheel 16 causing the worm wheel to rotate on its axis around the bearing cuff 12. As the worm wheel rotates on this axis, so must the attached roller arm 36 and cutting arm 34 (16, 34, 36 . . . the cutting head).

Figure 9:
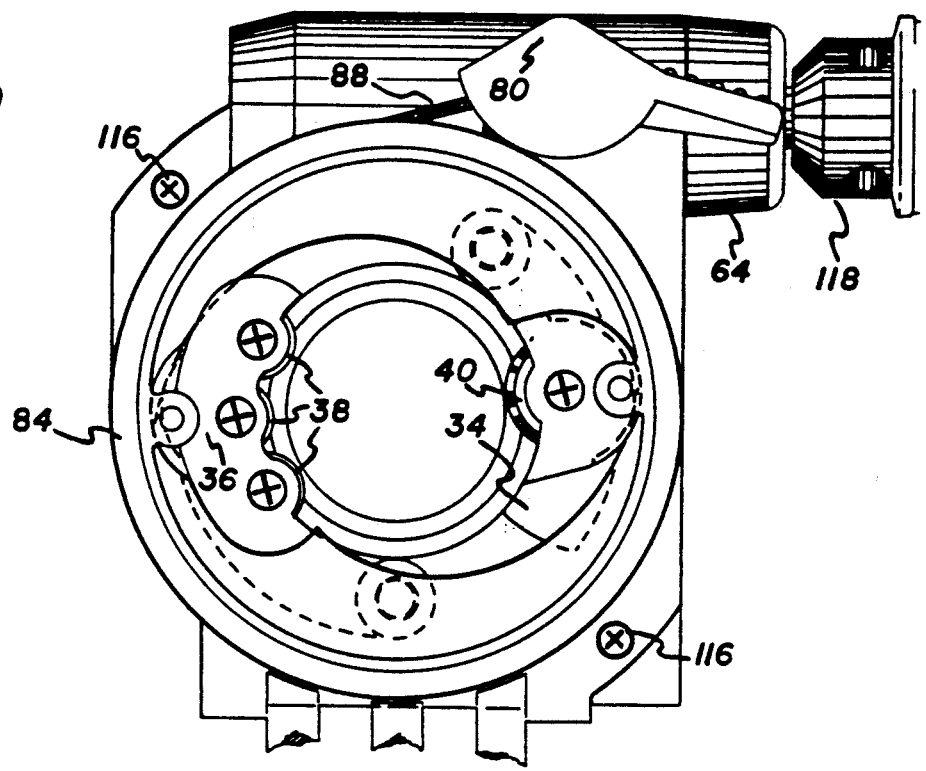
FIG. 9 is a plan side view of one embodiment of the invention with the Side panel removed from the compression cap allowing detailed inspection of the roller and cutter arms as well as the cam layer of the compression cap as they relate to each other in the tool's open position.
Figure 10:
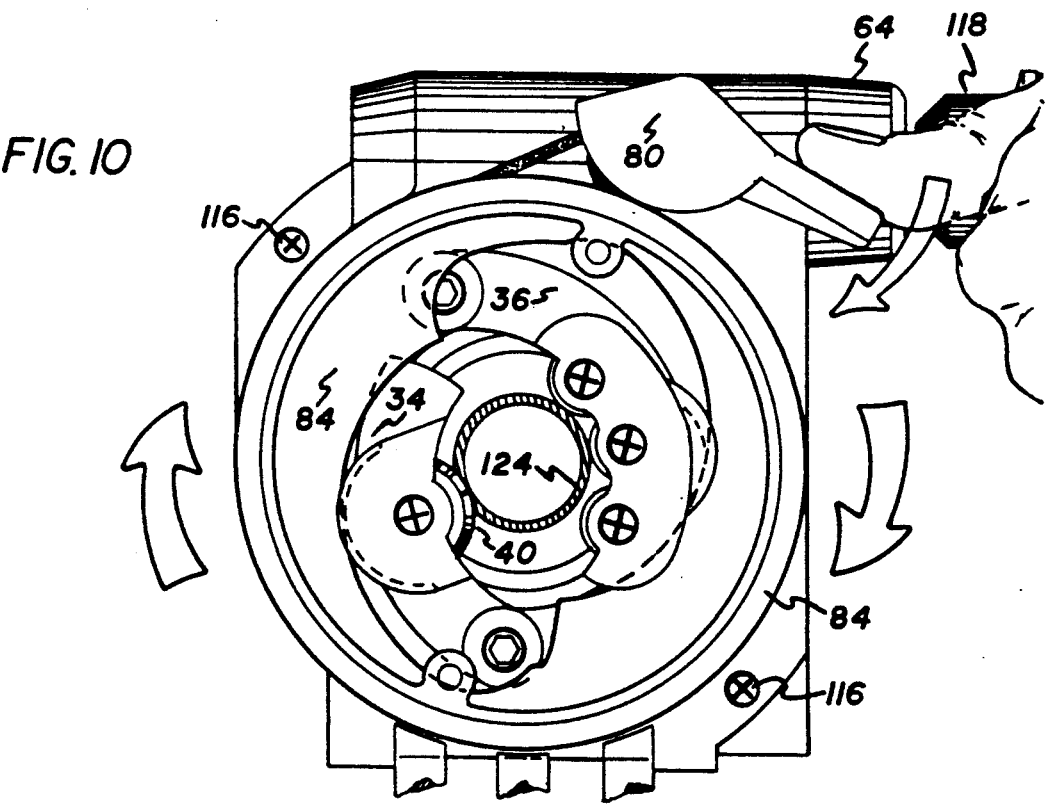
FIG. 10 is a plan side view of the embodiment in FIG. 9, with the invention in the closing position around an example piece of tubing.

FIGS. 2 and 3 show the compression cap 84, 86 in sectioned views, as it relates to the rest of the invention. As discussed above, the outward tension of the reset springs 30 and 32 force the roller arm and cutter arm outward from the center of the worm wheel's axis. The compression cap-main has a cam layer within its wall. This layer forms the compression cam shape illustrated in FIGS. 9 and 10 (plan side views of the invention shown without the side cap panel 86 for clarity). FIGS. 9 and 10 show the compression cap-main 84 secured to the tool body by the roller arm and the cutter arm which both have a cam-following protrusion located on the general point of contact with the compression cap. These lips over lap the cam layer of the compression cap-main and press against it with the outward force of the reset springs. This allows the cam of the compression cap to slide along the arm's contact points while being secured to the tool.

In sliding along the arms 34, 36, the compression cap-main 84 changes its reference to the arms at the contact points of the cam layer. This change in reference causes the arms to be forced concentrically inward until contact is made with the tube to be cut. This is discussed in detail below.

(Ref. FIGS. 5, 9, 10) Because of the friction contact with the compression cap-main 84 and the roller and cutter arms 34, 36, the compression cap orbits with the cutting head when the worm wheel 16 is driven by the drive shaft 18. A friction belt 88 is wrapped around the outer wall of the compression cap-main 84 and is recessed into a channel formed in the compression cap-main.'s wall The two ends of the belt are joined together and secured inside a slot in a compression trigger 80 by a belt securing screw 82. The compression trigger is swivel mounted to the tool body by a 'C' clip 74 and once the trigger is depressed, a reset spring 76 will compress allowing it to return to the reset position after each cut. A friction washer 78 is situated between the trigger and the left half of the tool body 72 to alleviate some of the wear caused by the parts rubbing together.

The cutting of the pipe works as follows. The drive shaft 18 is motor driven through one of several means. As described above when the drive shaft rotates, the worm wheel 16 orbits around the bearing cuff 12. The arms 34 and 36 are swivel mounted to the worm wheel, and the compression cap-main 84 is slide mounted to the arms. With the belt 88 remaining stationary sliding inside the cap's channel (due to the belt's attachment to the trigger 80), the cap-main 84 rotates with a 1:1 ratio to the cutting head. This ratio is constant as long as ample slack remains in the friction belt 88. When the trigger 80 is depressed, the belt slack is taken up causing the belt 88 to tighten around the compression cap-main 84. This tightening of the belt causes the compression cap to slow its orbit slightly in relation to the constant orbit of the worm wheel. This slowing of the compression cap's orbit causes it to change reference to the inner arms 34 and 36 at the contact points (cam-followers to cam edge). As the worm wheel 16 continues to orbit at a given rate, the cap 84 is slowed and the arms 34 and 36 ride the cam edge concentrically, compressing around the tubing to be cut. The tubing is scored on the first orbit, and cut deeper with each additional orbit until the tube wall is completely severed.

(REF. FIGS. 9 and 10) To reset the invention, the user simply lets up on the trigger 80 and the reset springs 30 and 32 located under each arm 34 and 36 will force the arms contacts outward, sliding along the cam edge of the compression cap-main 84 causing the compression cap to reverse orbit back to the open position FIG. 9.

FIG. 9 and FIG. 10 show the chosen configuration as being attached to a power drill. The attachment device or chuck 118 of the drill is attached to the drive shaft of the tube cutter 18. It should be understood that the attached drill in this particular configuration serves as the removable drive system and it forms no part of the instant invention and any power source such as an electric, hydraulic, or pneumatic motor may be utilized with the cutting tool according to the invention.

Figure 7:
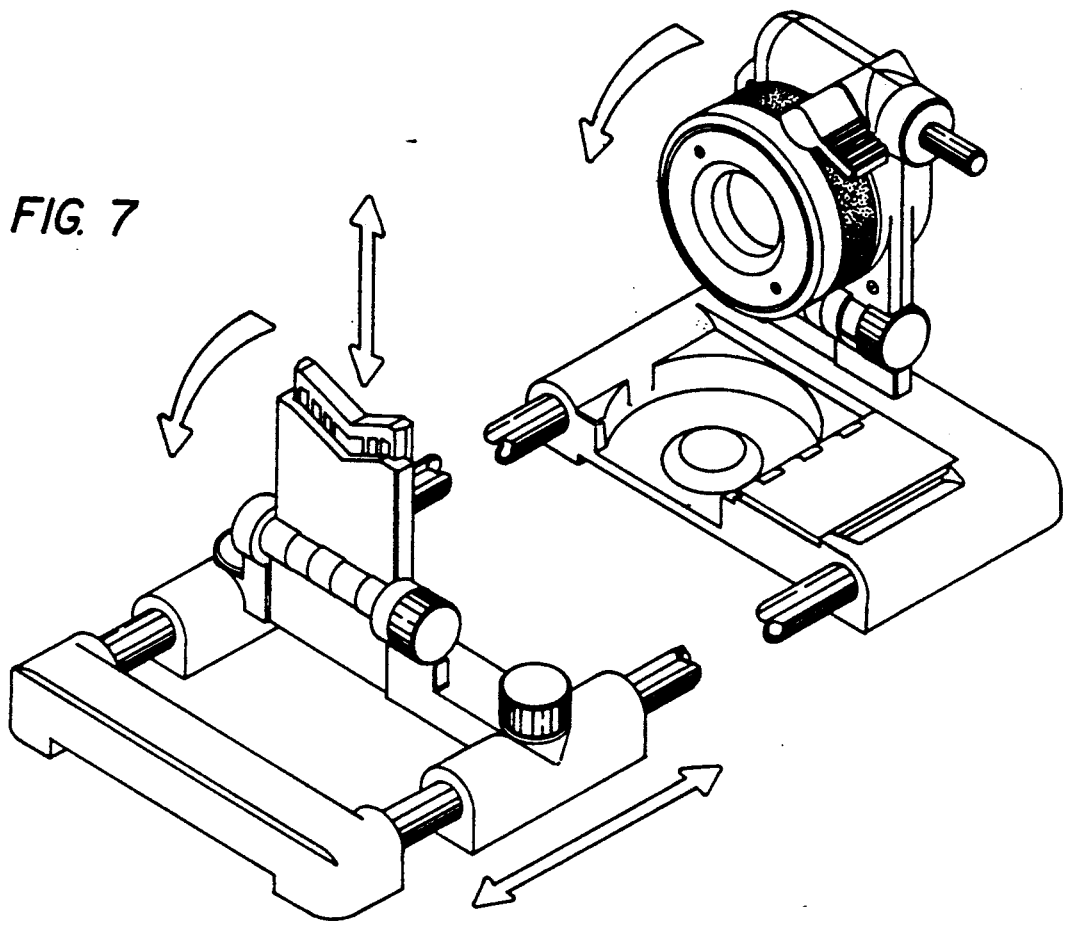
FIG. 7 is a perspective view of one embodiment of the invention set up in a ready to operate mode and utilizing one trough sub-assembly for tube stabilizing.
Figure 8:
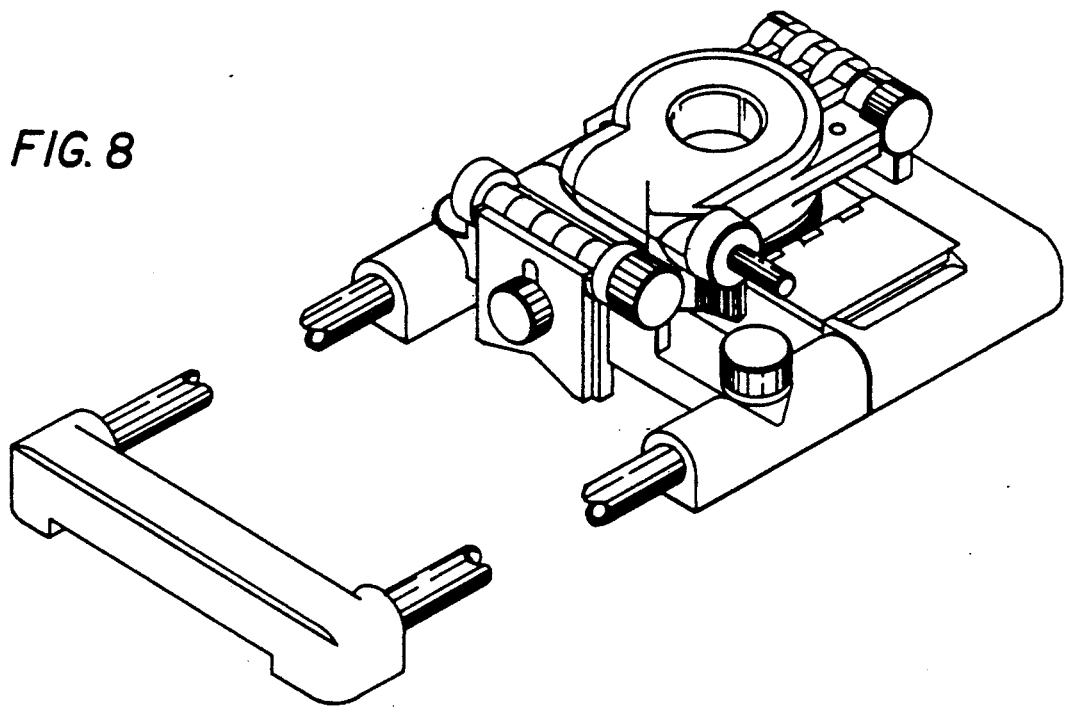
FIG. 8 is a perspective of the same embodiment as FIG. 7, shown in the closed mode ready for transport or storage.

FIGS. 4 and 5 are exploded views of the invention and show that all the above mentioned parts of the invention, when assembled, are attached by a hinge half, which formed into the tool body 10, to a base 54 which contains the other half of the hinge. The base also has formed in it a depression into which the face of the tool can fit when folded down. These two parts 10, 54 are joined by a hinge pin 52 that is held inside a hinge tube 50 to aid in the hinge stability. Both these parts 50 and 52 are passed through the hinge loops of the tool body 10 and the base 54 when the hinge halves are aligned properly. The end of the hinge pin 52 is threaded so as to accept the spiral adjustment qualities of a nut 60 once it is secured in the depression of a hinge lock knob 58 and threaded onto the hinge pin. A compression washer 56 is situated between the hinge lock knob and the base to aid in function. This hinge assembly allows the tool to be set up in the operating position as shown in FIG. 7, folded down to the protective storage or shipping position for as shown in FIG. 8.

Figure 6:
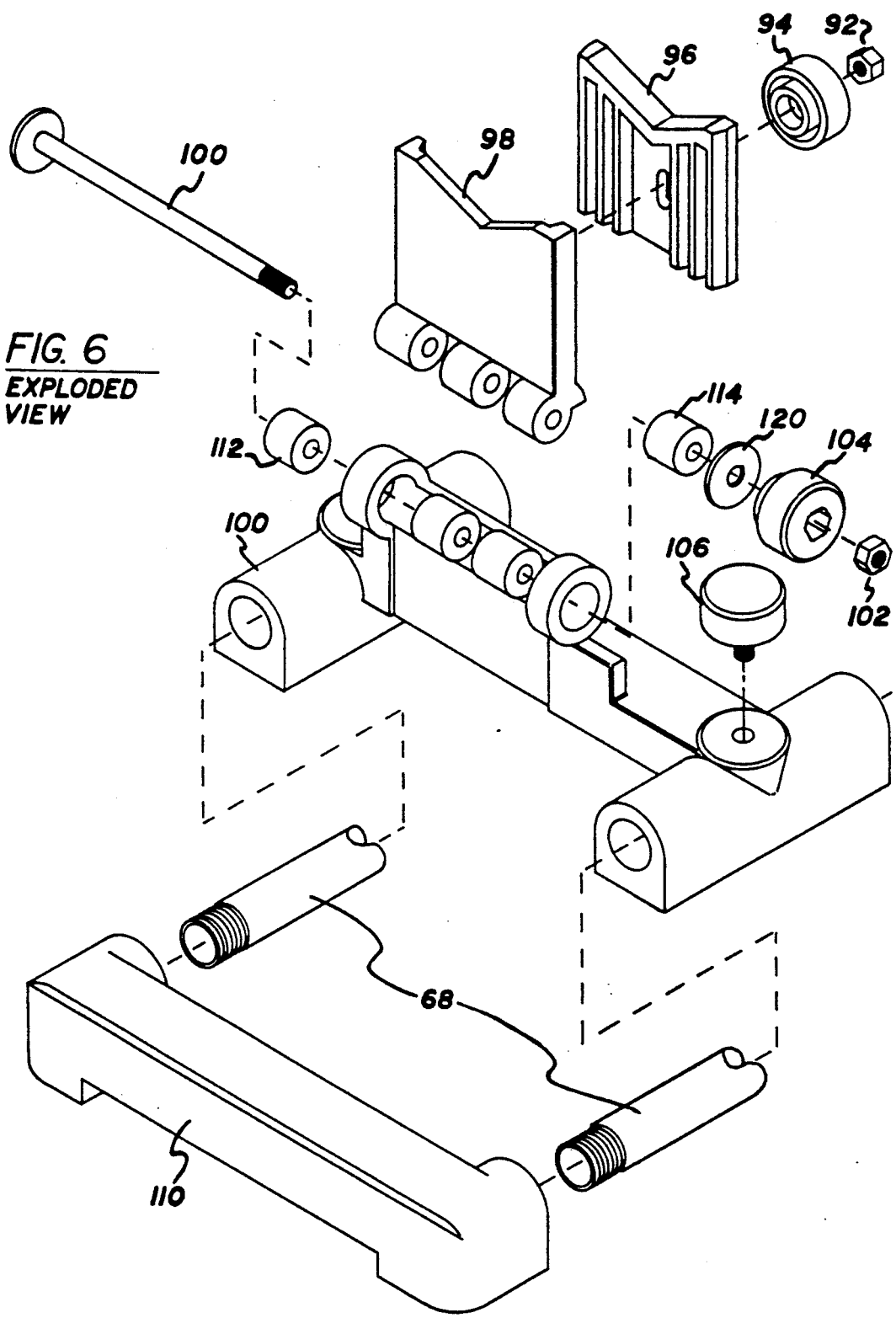
FIG. 6 is the third exploded views which when combined form a detailed exploded view including each part of a first embodiment of the inventive tube cutting device especially adapted for use with smaller diameter tubing.

As seen in FIG. 4, the base 54 has a storage compartment with a hinged door 62 which is secured with a hinge pin 66. The base 54 has two threaded channels formed parallel to each other and perpendicular to the base hinge. A pair of rail pipes 68 are secured into the base 54 by the threaded fit. These rails run parallel to each other and are identical. At the other end of these rails is secured a threaded end cap 108 as seen in FIGS. 6, 7 and 8. This end cap 108, the two rails 68, and the tool base 54, form a work station frame. This frame stabilizes the invention and guides a tube stabilizing assembly on the rails.

FIG. 6 shows a trough stabilizing assembly, (the use of such devices are optional and the cutting tool described thus far is completely functional without the use of such stabilizing devices). This assembly is made up of a trough base 100 which has formed into it two parallel channels which are slightly larger than the rails 68 of the work station frame, allowing it to be slid along these rails for positioning. The trough base 100 has a threaded channel located over one of the frame rails. A lock knob 106 threads through this channel. This knob serves as the locking device for the base. The knob operates by simply screwing or unscrewing it depending on if the user wants to secure the trough base to the rail or to slide the base along the rails. To lock the through base, the threaded knob must be adjusted to pinch against the rail preventing the base from moving. Formed in the trough base 100 is one half of the trough's hinge. A fixed trough with hinge piece 98 contains the other half of the hinge. When properly placed into the base, the fixed trough piece is held in place by a hinge pin 110 which passes through the two hinge halves and a set of compression cylinders, 112 and 114, on either end. One end of the hinge pin is threaded so as to accept the spiral adjustment qualities of a nut 102. This nut is secured in the depression of a lock knob 104 and threaded onto the hinge pin 110. A compression washer 120 is situated between the lock knob 104 and the base hinge 100 to aid in the compression for locking the hinge into position. This hinge assembly allows the trough to be set up in the operating position as shown in FIG. 7, or folded down to the protective storage or shipping position for as shown in FIG. 8.

FIG. 6 shows a height adjustable piece of the trough 96, which aids in the tube cutting process by situating the tubing at a perpendicular and centered relation to the tool's opening when this piece is adjusted to the necessary height for a given tube diameter. The adjustable trough piece 96 has vertical ribs formed in it which mesh with a set of vertical ribs formed in the fixed trough piece 98. The adjustable trough piece 96 also has a vertical slot formed in it to further track the trough's adjustment. The fixed through piece 98 has a threaded rod formed in it which passes through the slot in the adjustable trough piece 96. With the aid of a lock knob 94 and a trough nut 92, this threaded rod secures the adjustable through to the fixed trough with compression.

Figure 12:
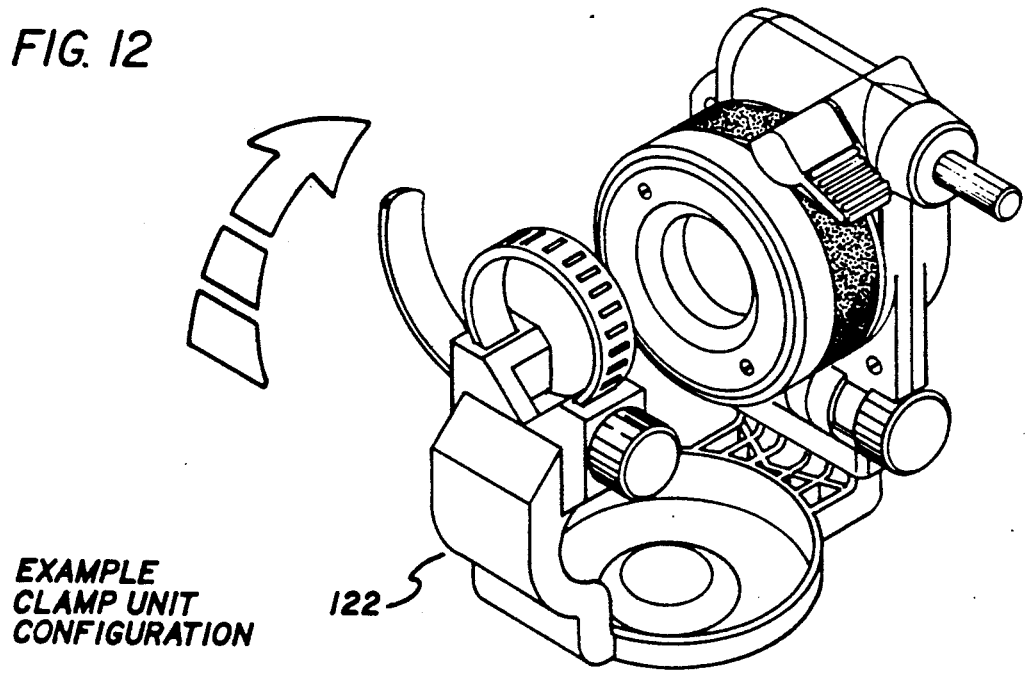
FIG. 12 is a perspective view of a tool embodiment which incorporates the use of the later mentioned clamping device and which has been configured without the work station frame.

A second embodiment as shown in FIG. 12 may be used where extreme portability is desired instead of setting up a work station. This embodiment of the invention utilizes a clamping device 122 to help stabilize and center the tubing while cutting. This embodiment eliminates the base and frame structure, and is powered by the same options as the first described embodiment. In this embodiment, the orientation and function of all parts in the tool are the same as the previously described embodiment.

Figure 11:
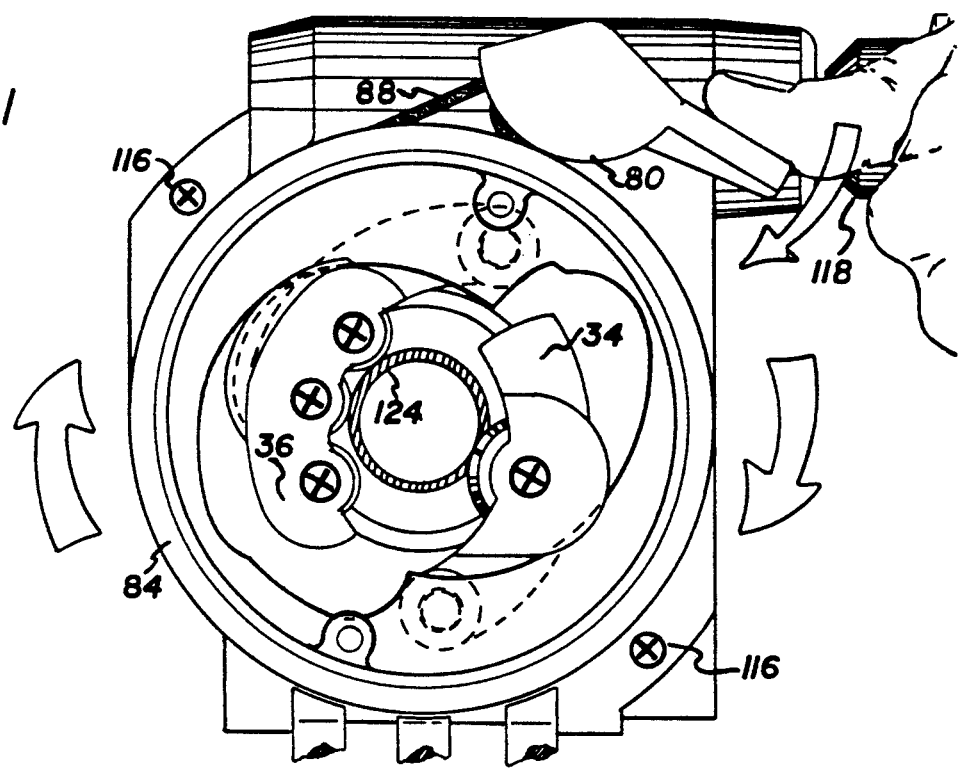
FIG. 11 is a plan side view of one embodiment of the invention similar to FIG. 10 but with the arms and compression cap configured in reverse to pull the cutter wheel over the tube surface instead of pushing it as done in FIGS. 9 and 10.

FIG. 11 shows a third embodiment of the invention where all principles of the first and or second embodiments apply with the exception of the arm and cam relations which are simply reversed compared to FIGS. 9 and 10. The orbit of the worm wheel 16 and the relation of the drive shaft 18 to the worm wheel are the same as the first two embodiments. All bearing cuffs and tool bodies are also the same. There are three differences: first, the roller arm 36 in FIG. 11 arcs counter clockwise to its mounting point as apposed to arcing clockwise in FIG. 9; second, the cutter arm 34 in FIG. 11 arcs counter clockwise to its mounting as apposed to clockwise in FIG. 9; and third, FIG. 11 shows the cam layer in the compression cap-main 84 is reversed in comparison to the cam layer in FIGS. 9 and 10 to accommodate the altered roller and cutter arms. The functional result of these changes is that the arms and in turn rollers and cutting wheel are pulled over the surface of the tubing in FIG. 11 instead of FIGS. 9 and 10 where the arms are pushed over the surface of the tubing. All principles of operation are identical beyond these three changes.

SUMMARY, RAMIFICATIONS, AND SCOPE OF INVENTION

Thus the reader will see the gear driven tube cutter provides a new dimension to the established art of construction as it relates to tube cutting. With a streamlined process of cutting tubes to pre-established lengths, the time and effort factors are lessened in the areas of repetition. An assembly line practice is being introduced, where applicable, with the aid of this invention. The ease and speed of the invention will aid in many of the modular trends practiced in construction today. One of the largest benefactors of the invention are those users who practice modular or repetitive construction and manufacturing where tubing is used identically in a large number of units being produced.

Once the tube parts and their lengths are established for a single unit, the total number parts at given lengths can be established. There will be no need to measure each individual piece as it relates to each individual unit. This application of tube cutting is by no means limited to architecture, and can be used where ever tubing is used even when modular assembly principles do not arise.

The foregoing description is provided for illustrative purposes only and should not be construed in any way limiting the invention, but rather as an exemplification of several professed embodiments thereof. Many other variations are possible. For example:

The use of a beveled wheel and drive gears could be utilized to drive the cutting head as defined in the first embodiment instead of worm gears;

The use of two rollers on the roller arm FIG. 4 instead of the proposed three in FIGS. 1, 2, 3, 9, 10, 11, and 12;

The use of a different friction device to slow the orbit of the compression cap, such as a brake pad mounted to a lever instead of the proposed friction belt and trigger;

The locating of the drive shaft at the bottom of the cutter head instead of at the top, in the illustrated embodiments, to allow for a lower center of gravity when attaching a cordless drill or electric motor;

Although the description above contains many specifications, these should not be construed as limiting the scope of the invention but as merely providing illustrations of the presently preferred embodiments of this invention. Accordingly, the scope of the invention should be determined not by the embodiment(s) illustrated, but by the appended claims and their legal equivalents.

What I claim is:

1. A gear driven tubing cutting tool for cutting through a wall of tube comprising:
    (a) a tool body defining a first hole, generally "O" shaped, opening completely through the entire body to accommodate a tube therein;
    (b) a cutting head rotatably mounted within the cutting body so as to rotate about a first axis, the cutting head defining a second hole, generally "O" shaped, opening which coincides with the first hole;
    (c) a generally "O" shaped driven gear attached to the cutting head such that an opening defined by the generally "O" shape coincides with the second hole;
    (d) cutting means mounted on the cutting head and adapted to extend into the second hole so as to bear against the tube therein;
    (e) feed means operatively associated with the cutting means to urge the cutting means against the tube, said feed means including a compression cap rotatably mounted to the cutting head, and a hollow cam formed on the inner wall of the compression cap; and
    (f) a drive gear rotatably mounted in the tool body so as to rotate about a second axis, the drive gear operatively engaging the generally "O" shaped gear so as to cause rotation of the cutting head about the first axis to draw the cutting means about the periphery of the tube to thereby sever the tubing wall.

2. The gear driven cutting tool according to claim 1 wherein the gear drive means comprises:
    (a) a drive gear operatively engaging the generally "O" shaped gear; and,
    (b) means to connect the drive gear to a power source.

3. The gear driven cutting tool according to claim 2 wherein the means to connect the drive gear to a power source comprises:
    (a) a worm gear rotatably mounted in the tool body and drivingly engaging a generally "O" shaped worm wheel; and,
    (b) means to connect the worm gear to a power source.

4. The gear driven cutting tool according to claim 2 wherein the means to connect the main drive gear to a power source comprises:
    (a) a bevel drive gear rotatably mounted in the tool body and operatively engaging a generally "O" shaped bevel gear; and,
    (b) means to connect the bevel drive gear to a power source.

5. The gear driven cutting tool according to claim 1 wherein the cutting means comprises:
    (a) an arm pivotally mounted to the cutting head; and,
    (b) a cutting wheel rotatably mounted to one end of the arm.

6. The gear driven cutting tool according to claim 5 wherein the feed means comprises means for mechanically feeding the cutting wheel towards the tube as the cutting head rotates.

7. The gear driven cutting tool according to claim 1 wherein the mechanical feed means further includes:
    a cam follower formed in an arm attached to the cutting head and bearing against the cam; and,
    means to control the speed of rotation of the cam as the cutting head rotates.

8. The gear driven cutting tool according to claim 7 wherein the means to control rotation of the cam comprises;
    (a) a channel formed along the outer circumference of the compression cap;
    (b) a friction means to bias against the channel of the compression cap to thereby cause the cap and the cam within to slow rotation in relation to the cutter head; and,
    (c) a stationary means to manually control the amount of bias friction against the compression cap.

9. The gear driven cutting tool according to claim 8 wherein the gear drive means comprises:
    (a) a drive gear operatively engaging the generally "O" shaped gear; and,
    (b) means to connect the drive gear to a power source.

10. The gear driven cutting tool according to claim 9 wherein the means to connect the drive gear to a power source comprises:
    (a) a worm gear rotatably mounted in the tool body and drivingly engaging a generally "O" shaped worm wheel; and,
    (b) means to connect the worm gear to a power source.

11. The gear driven cutting tool according to claim 9 wherein the means to connect the main drive gear to a power source comprises:
    (a) a bevel drive gear rotatably mounted in the tool body and operatively engaging a generally "O" shaped bevel gear; and,
    (b) means to connect the bevel drive gear to a power source.

12. The gear driven cutting tool according to claim 1 further comprising stabilizing means to guide the tube to the cutting tool.

13. The gear driven cutting tool according to claim 12 wherein the stabilizing means comprises a trough means.

14. The gear driven cutting tool according to claim 13 wherein the trough means comprises:
   (a) a first trough member attached to the tool body or work station frame by a hinge means;
   (b) a second trough member vertically slide mounted to the first trough member; and,
   (c) means to lock or secure the second trough member to the first trough member at several settings to stabilize various diameter tubing.

15. The gear driven cutting tool according to claim 12 wherein the stabilizing means comprises a clamping means to stabilize the tubing to the cutting tool or tool work station.

16. The gear driven cutting tool according to claim 15 wherein the clamping means comprises:
   (a) a compression means pivotally attached to the tool body or work station frame by a hinge means; and,
   (b) means to adjust the compression means to stabilize various diameter tubing.

17. The gear driven cutting tool according to claim 12 wherein the gear drive means comprises:
   (a) a drive gear operatively engaging the generally "O" shaped gear; and,
   (b) means to connect the drive gear to a power source.

18. The gear driven cutting tool according to claim 17 wherein the means to connect the drive gear to a power source comprises:
   (a) a worm gear rotatably mounted in the tool body and drivingly engaging a generally "O" shaped worm wheel; and,
   (b) means to connect the worm gear to a power source.

19. The gear driven cutting tool according to claim 17 wherein the means to connect the main drive gear to a power source comprises:
   (a) a bevel drive gear rotatably mounted in the tool body and operatively engaging a generally "O" shaped bevel gear; and,
   (b) means to connect the bevel drive gear to a power source.

20. The gear driven cutting tool according to claim 12 wherein the cutting means comprises:
   (a) an arm pivotally mounted to the cutting head; and,
   (b) a cutting wheel rotatably mounted to one end of the arm.

21. The gear driven cutting tool according to claim 20 wherein the feed means comprises means for mechanically feeding the cutting wheel towards the tube as the cutting head rotates.

22. A gear driven tubing cutting tool for cutting through a wall of tube comprising:
   (a) a tool body defining a first hole, generally "O" shaped, opening completely through the entire body to accommodate a tube therein;
   (b) a cutting head rotatably mounted within the cutting body so as to rotate about a first axis, the cutting head defining a second hole, generally "O" shaped, opening which coincides with the first hole;
   (c) a generally "O" shaped driven gear attached to the cutting head such that an opening defined by the generally "O" shape coincides with the second hole;
   (d) cutting means mounted on the cutting head and adapted to extend into the second hole so as to bear against the tube therein;
   (e) feed means operatively associated with the cutting means to urge the cutting means against the tube, the feed means comprises:
   (a) a compression cap rotatably mounted to the cutting head;
   (b) a hollow cam formed on the inner wall of the compression cap;
   (c) a cam follower formed in the arm and bearing against the cam; and,
   (d) means to control the speed of rotation of the cam as the cutting head rotates, and,
   (f) a drive gear rotatably mounted in the tool body so as to rotate about a second axis, the drive gear operatively engaging the generally "O" shaped gear so as to cause rotation of the cutting head about the first axis to draw the cutting means about the periphery of the tube to thereby sever the tubing wall.

23. The gear driven cutting tool according to claim 22 wherein the means to control rotation of the cam comprises;
   (a) a channel formed along the outer circumference of the compression cap;
   (b) a friction means to bias against the channel of the compression cap to thereby cause the cap and the cam within to slow rotation in relation to the cutter head; and,
   (c) a stationary means to manually control the amount of bias friction against the compression cap.

24. The gear driven cutting tool according to claim 23 wherein the gear drive means comprises:
   (a) a drive gear operatively engaging the generally "O" shaped gear; and,
   (b) means to connect the drive gear to a power source.

25. The gear driven cutting tool according to claim 24 wherein the means to connect the drive gear to a power source comprises:
   (a) a worm gear rotatably mounted in the tool body and drivingly engaging a generally "O" shaped worm wheel; and,
   (c) means to connect the worm gear to a power source.

26. The gear driven cutting tool according to claim 24 wherein the means to connect the main drive gear to a power source comprises:
   (a) a bevel drive gear rotatably mounted in the tool body and operatively engaging a generally "O" shaped bevel gear; and,
   (b) means to connect the bevel drive gear to a power source.

* * * * *